Nov. 22, 1966 — J. C. TURRO — 3,286,489
ANTI-BACKLASH PRECISION COUPLING
Filed Jan. 7, 1965
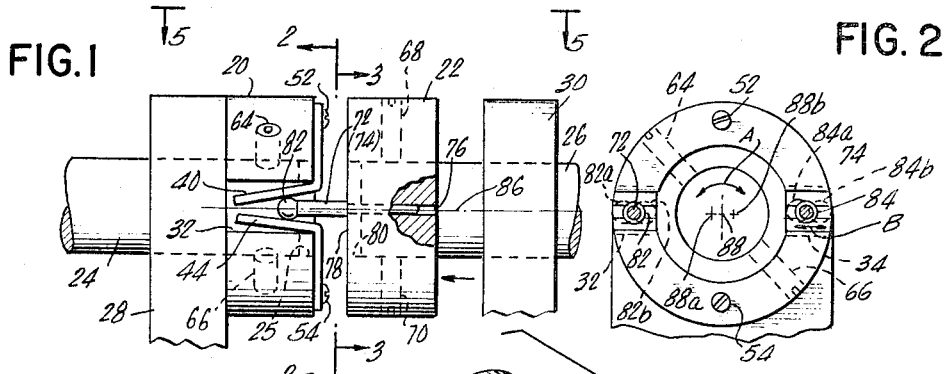
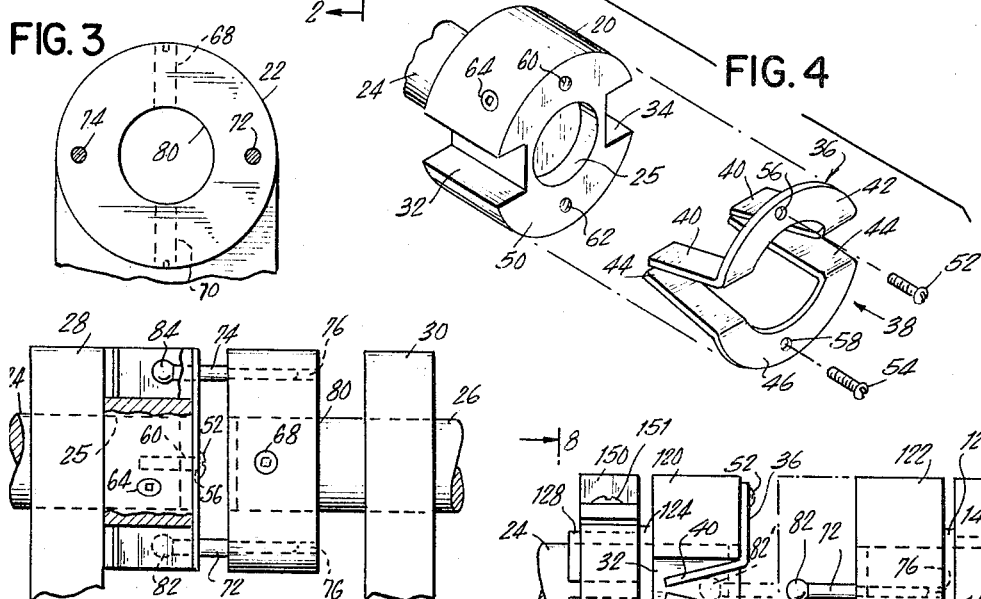
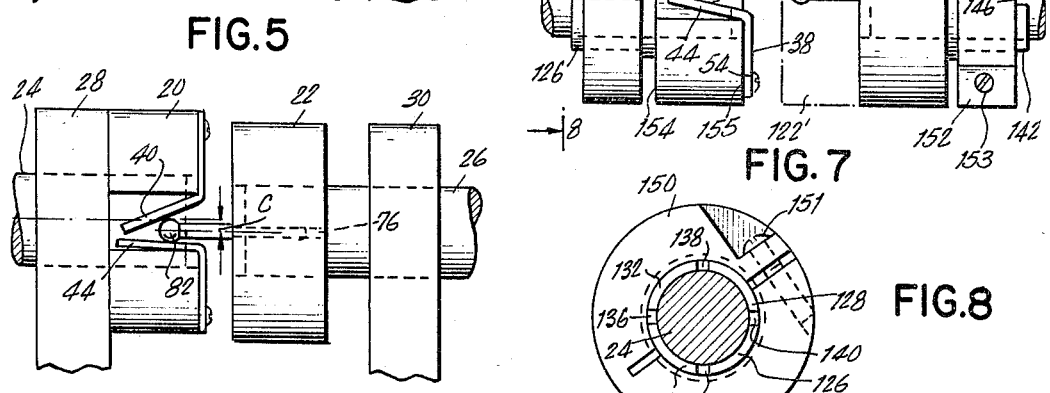
INVENTOR.
JEROME C. TURRO
BY Briskin & Goldfarb
ATTORNEYS

United States Patent Office 3,286,489
Patented Nov. 22, 1966

3,286,489
ANTI-BACKLASH PRECISION COUPLING
Jerome C. Turro, 245 Rumsey Road, Yonkers, N.Y.
Filed Jan. 7, 1965, Ser. No. 424,015
6 Claims. (Cl. 64—15)

This application relates to an anti-backlash precision coupling, and more particularly to a shaft coupling applicable for use in precision instruments as well as in other industrial applications wherein running torque is transmitted between a ball and a leaf spring so as to minimize friction and wear and to eliminate backlash.

Shaft couplings are used in mechanical installations in order to connect shafts so that torque may be transmitted from one shaft to the other. Flexible shaft couplings are provided in order to allow for shaft misalignment. When shafts are connected, it is seldom practical to align them perfectly and accurately. Alignment may vary due to temperature distortion, pressure wear in the bearings, deflection from external loads, warpage of frames or supports, and other factors. Misalignment or shaft displacement may be of several types; namely, parallel misalignment, angular misalignment, combined parallel and angular misalignment, skewed misalignment, axial shaft motion or end float, and torsional shaft vibrations.

With shaft misalignment present, many couplings of the prior art will wear out rapidly, especially if misalignment is not limited. When misalignment is greater than that allowed by the coupling, the coupling will impose side thrust which can cause shaft-bending stresses and result in radial loads which can damage the component bearings. A problem of the prior art has therefore been to obtain a good flexible shaft coupling which will last under conditions of operating misalignment without adversely affecting shafts and bearings.

It is therefore an object of the present invention to provide a flexible shaft coupling which is adapted for use under constant as well as variable velocity, which may be adapted for any size and capacity without being damaged by the force imposed on the coupling and which will dampen shock forces imposed from the driving shaft onto the coupling.

It is a further object of the invention to provide a flexible shaft coupling which will have a long life without adversely affecting the life of the bearings or the shafts associated with the coupling.

It is still another object of the invention to provide a flexible shaft coupling which will be reliable and have a predictable preformance under widely varying conditions.

Still another object of the invention is to provide a flexible shaft coupling which will have long wear and which will dependably transmit torque under conditions where the shaft conditions have either parallel misalignment, angular misalignment, combined parallel and angular misalignment, skewed misalignment, axial shaft motion, torsional or other vibrations, and which will tend to dampen such shaft vibrations.

To these ends, and in accordance with one feature of my invention, I provide a pair of shaft collars or rings adapted to be set screwed or otherwise fixed onto the ends of the respective shafts to be coupled. One of the shaft rings (either on the driven or driving shaft) is provided with a diametrically opposed pair of pins oriented parallel to the axis of the shaft. At the ends of each of these pins is fixedly formed a spherical ball having a diameter slightly larger than that of the pin. The other shaft ring, located on the end of the other shaft to be coupled, is provided along its cylindrical sides with rectangular channel-shaped recesses whose open front and rear ends are substantially centered and aligned relative to the afore-mentioned ball-headed pins of the first shaft ring. A pair of U-shaped flat springs are bent into an angle somewhat greater than 90 degrees between the plane of the pair of legs of the U and the plane of the bridge portion of the U. The bridge portion of each of the U-shaped springs is fastened to the front face of the second of the shaft rings so that one leg of each of the two leaf springs is disposed into one of the rectangular channel shaped recesses. Torque is transmitted from the legs of the leaf spring and the end ball of the pin, in either direction. One or the other of the legs of the two opposed leaf springs in a respective channel take up misalignment or off-center pressure of the ball on a respective pin, which may be unsymmetrically applied with respect to the opposed pin. In this manner zero backlash is provided, the coupling may be adapted to high speeds, and it can be used at relatively high temperatures without being adversely affected. Since the only contact between the shaft members is between a ball and the flat surface of a leaf spring, there is a minimum of wearing action and friction, the coupling requires no lubrication, the coupling may be driven in either direction with equal characteristics, it is simple to attach, it may be made small in size and light in weight and is relatively simple and inexpensive to manufacture and assemble.

These, together with various ancillary objects and other features of the invention which will become more apparent as the following description proceeds, are attained by this article of manufacture, preferred embodiments of which are illustrated in the accompanying drawings by way of example only, wherein:

FIG. 1 is an elevational view, partially cut away, showing the coupling of the invention assembled on a pair of shafts which are slightly displaced axially for purposes of illustration;

FIG. 2 is an end view of one of the shafts and coupling portions taken along the plane of line 2—2 of FIG. 1;

FIG. 3 is an end view of the other portion of the coupling taken along the plane of line 3—3 of FIG. 1;

FIG. 4 is an exploded perspective view of one portion of the coupling of the invention;

FIG. 5 is a plan view of the device of FIG. 1 taken along the plane of line 5—5 of FIG. 1;

FIG. 6 is an elevation view of the device of FIG. 1 illustrating the position of the shaft coupling with the shafts shown in parallel misalignment;

FIG. 7 is a modification of the device of FIGS. 1–6 showing an alternate method of clamping the coupling rings to the shaft; and FIG. 8 is an end view of the device of FIG. 7 taken along the plane of line 8—8 of FIG. 7.

In the drawings, the same numerals designate the same or functionally similar components throughout the several views. The shaft coupling according to the invention comprises two generally cylindrical ring bodies 20, 22, which are respectively mounted on the ends of shafts 24, 26. Either of the shafts 24, 26 may be the driven shaft, and either may be the driving shaft. Furthermore, the shafts 24, 26 may be somewhat out of alignment, either in parallel misalignment, angular misalignment or skewed misalignment, to an extent more than heretofore possible, without affecting the functioning of the coupling. However, for the sake of illustration, the shafts 24 and 26 in FIGS. 1 and 5 are illustrated as being in alignment. The shafts 24, 26 are suitably journaled in bearings (not shown) in shaft supports 28, 30.

As best shown in FIGS. 2 and 4, the coupling body portion 20 is provided with channel-shaped recesses 32, 34 on diametrically opposed sides of the body 20. A pair of leaf springs 36, 38, preferably made of beryllium-copper or stainless steel spring material are formed in the illustrated bent U-shaped configuration. The pair of flat legs 40, 40 of the spring 36 both lie in a common plane and which plane forms an angle greater than 90 degrees with the plane of the bridge portion 42 of the U-shaped spring 36. Similarly, the pair of legs 44, 44 of the second spring 38 both lie in another common plane which makes an angle greater than 90 degrees with the bridge portion 46 of the U-shaped spring 38. The bridge portions 42, 46 of the springs 36 and 38 are fastened in mutual symmetrically opposed position to the front end face 50 of the member 20 by respective screws or rivets 52, 54 passing through holes 56, 58 in the springs 36, 38 and respectively engaging threaded holes 60, 62 in the front end face 50. The pairs of legs 40, 44 of the opposed springs 36, 38 thus together form an outwardly widening pair of spring walls within the respective recesses 32, 34. The coupling body portion 20 is mounted on the shaft 24 by means of set screws 64, 66, or any other suitable clamping means. The body portion 20 is provided with an axial bore 25 for receiving the shaft 24.

Mounted on the other shaft 26 is the other body portion 22 of the coupling. The body portion 22 is likewise fixed to its shaft by means of set screws 68, 70, or by other suitable clamping means. Fixedly mounted in the cylindrical body member 22 are a pair of pins 72, 74 press-fitted into a pair of bores 76 and projecting outwardly from the forward end face 78 of the coupling body portion 22. The pins 72, 74 are diametrically opposed an equal distance on each side of the axis of the bore 80 centered in the body member 22, and are each provided with a spherically shaped head 82, 84 (FIG. 5). The surfaces of spring legs 40, 44 which contact the ball members 82, 84 are highly polished to reduce friction.

Ideally, both shafts 24, 26 are aligned along an axis 86 (FIG. 1) passing through the center point 88. The shafts 24, 26 may be rotated in either direction as indicated by the arrow A in FIG. 2, and either shaft 24 or 26 may drive or be driven by the other shaft. Due to misalignment, either shaft 24 or 26 may be shifted away from the ideal axis 86 so that the shafts may be in parallel misalignment, i.e. the shafts being parallel or offset; or the shafts may be in angular misalignment, i.e. the shafts are not parallel but their axes intersect at the center of the coupling; or the shafts may have a combination of parallel and angular misalignment; or the shafts may be in skewed misalignment, i.e. the shafts are not in the same plane; or one or both of the shafts 24, 26 may have axial motion or end float; or the shafts may exhibit torsional vibrations in any or all directions. For the sake of simplicity, only axial parallel displacement is illustrated. For example, as indicated by the arrow B in FIG. 2, the axis of shaft 26, for example, instead of passing through point 88 at the midpoint between the coupling bodies 20, 22 may pass through point 88a, or be shifted along a line parallel to the shaft axis and passing through point 88a. The ball 82, instead of being at its normal location 82 as indicated in FIG. 2, then becomes shifted to position 82a to the left of its normal position 82, and the ball 84 becomes shifted to a position 84a to the left of its normal position 84 as indicated in FIG. 2. Similarly, if the axis of shaft 26 is shifted to the right relative to FIG. 2 so that it passes through a point 88b instead of being centered at 88, the ball 82 shifts to the right to position 82b, and the ball 84 shifts to the right to a position 84b. As may be seen from FIGS. 2 and 5, in any of the lateral positions illustrated for the spherical balls 82, the ball 82 is still tightly wedged between the faces of spring legs 40, 44 located in the recess 32, and the ball 84 is similarly tightly wedged between the other spring faces 40, 44 in the recess 34 on the opposite side of the coupling.

As shown in FIG. 6, the axis of shaft 26 may also become offset downwardly, for example an amount C, as indicated between the arrows illustrated in FIG. 6. Nevertheless, the ball 82 still remains engaged with each of the faces of the spring legs 40, 44 in the recess 32, and the other ball 84 likewise remains engaged with the other spring faces 40, 44 in the other recess 34. The spring legs 40 are biased so as to be urged outwardly to remain in contact with the respective balls 82, 84, and the spring legs 44 are pressed by the balls inwardly closer to the lateral faces of channels 32 and 34 which thus limit, to a minimum of approximately 90 degrees, the amount that the spring 38 can bend.

Also, if the coupling bodies 20, 22 become shifted axially closer together or further apart due to end float in one or the other or both of the shafts 24, 26, the balls 82, 84 still remain wedged between the pair of springs 40, 44 of the respective channels 32, 34. This end float variation is illustrated in FIG. 7.

FIG. 7 illustrates a modification of the device of FIGS. 1–6 in the detail regarding the means for clamping the coupling to its respective shaft. Instead of set screws, the coupling body portion 120 of FIG. 6 is provided with an integral split hub 124 having protruding prongs 126, 128, 130, 132, and defining therebetween interspaces 134, 136, 138, 140 (FIG. 8). Similarly, the body member 122 has a protruding hub portion 123 provided with a plurality of prongs, two of which are visible in FIG. 7 as indicated at 142, 144, with an interspace therebetween designated as 146. The split hub 124 of member 120 and the split hub 123 of member 122 are clamped onto their respective shafts 24, 26, as shown in FIGS. 7 and 8, by means of respective clamps 150, 152, fastened by set screws 151, 153 respectively. When axial end float occurs between shafts 24 and 26, the ball 82 of pin 72, at position 82', moves axially between the spring legs 40, 44 in the channel 32, but still maintains contact with both legs 40 and 44. The ball 84 (not visible in FIG. 7) moves similarly between the other pair of spring legs 40, 44 in the channel 34. Thus, within relatively wide limits the ball 82 remains engaged with the springs 40, 44 as the ball 82 moves axially between the rearward and forward faces 154, 155 of the member 120.

In addition to the clamping means such as the set screws engaging the shafts 24, 26 in the embodiments of FIGS. 1–6, and the clamps 150, 152 clamping the split hubs 124, 123 around their respective shafts, other clamping means may be used. For example, a C-spring of longitudinally split cylindrical shape may be inserted into a cylindrical recess formed within the shaft rings 20, 22 and may be peripherally tightened frictionally about the shafts by a set screw, as more fully explained in my copending application Serial No. 424,002, filed January 7, 1965, entitled "Combination Collar-Clamp and Shaft Coupling."

The point contact achieved between the ball members 82, 84 and the polished inner surfaces of spring legs 40, 44 assures a minimum amount of friction while transmitting torque from one shaft to the other, and the flexibility of spring legs 40, 44 assures damping of vibrations and ready compliance of the coupling to shaft misalignment and end-play.

It will be obvious to those skilled in the art, upon a study of this disclosure, that this invention permits of various modifications and alterations with respect to the individual components and arrangements disclosed, and hence can be embodied in couplings other than as particularly illustrated and described herein, without departing from the essential features of the invention and within the spirit and scope of the claims annexed hereto.

I claim:

1. A shaft coupling comprising, in combination, first and second generally cylindrical annular bodies each having a central bore, means on each of said bodies for clamping same to a respective shaft to be coupled together, said first body being provided with leaf spring means forming two pairs of diametrically opposed spring walls mutually flaring out forwardly toward said second body, said second body having a pair of projecting ball members fixed thereto, each ball member being positioned for insertable engagement between one pair of said two pairs of spring walls.

2. A flexible shaft-coupling comprising, in combination, first and second generally cylindrical annular bodies each having a central bore and adapted to be fixed at the opposed ends of respective shafts to be coupled, said first body being of generally cylindrical shape and having a pair of diametrically opposed recesses along the lateral sides thereof, and leaf spring means mounted on said first body and projecting into said recesses, said second body being of generally cylindrical shape and having a pair of opposed pins fixedly mounted on said second body and projecting longitudinally therefrom in a direction parallel to the axis of said central bore thereof, each of said pins being provided with a ball member fixed on the outer end thereof and engageable with said leaf spring means within a respective one of said recesses.

3. A coupling according to claim 2, said recesses being channel-shaped, said leaf spring means comprising two U-shaped leaf springs each having a pair of legs lying in a common plane and a bridge portion joining said pair of legs and lying in another plane which makes an angle greater than 90 degrees with said common plane of said legs, said first body having a generally planar front end surface transverse to the longitudinal axis thereof, one leg of one of said leaf springs and one leg of another of said leaf springs forming together a pair of walls within one of said recesses and flaring out mutually forwardly toward said front end surface for receiving one of said ball members therebetween.

4. A coupling according to claim 3, said bridge portions of each of said leaf springs being fixed to said front end surface in mutual symmetrically opposed position.

5. A coupling according to claim 4, said legs of said springs forming a pair of walls defining a pair of opposed flaring spring surfaces, said opposed spring surfaces being highly polished for reducing friction when in contact with a respective ball member.

6. A shaft coupling comprising, in combination, first and second generally cylindrical annular bodies each having a central bore, means on each of said bodies for clamping same to a respective shaft to be coupled together, said first body being provided with leaf spring means forming two pairs of diametrically opposed spring walls mutually flaring out forwardly toward said second body, said second body having a pair of projecting ball members fixed thereto, each ball member being positioned for insertable engagement between one pair of said two pairs of spring walls, said means for clamping comprising a split hub fixedly attached to at least one of said bodies and having prongs projecting axially and defining peripheral interspaces therebetween.

References Cited by the Examiner
UNITED STATES PATENTS

| 894,115 | 7/1908 | Case. | |
|---|---|---|---|
| 1,140,628 | 5/1915 | Steinhart | 64—14 |
| 1,403,272 | 1/1922 | Smith et al. | 64—15 |
| 3,066,502 | 12/1962 | Forrest | 64—15 |
| 3,187,521 | 6/1965 | Morris et al. | 64—23 |

FRED C. MATTERN, Jr., *Primary Examiner.*

H. C. COE, *Examiner.*